United States Patent
Sebastian

(10) Patent No.: US 9,188,459 B2
(45) Date of Patent: Nov. 17, 2015

(54) NAVIGATION SYSTEM WITH LOCATION ESTIMATION MECHANISM AND METHOD OF OPERATION THEREOF

(75) Inventor: Jose Sebastian, Sunnyvale, CA (US)

(73) Assignee: TELENAV, INC., Sunnyvale, CA (US)

(*) Notice: Subject to any disclaimer, the term of this patent is extended or adjusted under 35 U.S.C. 154(b) by 216 days.

(21) Appl. No.: 13/278,964

(22) Filed: Oct. 21, 2011

(65) Prior Publication Data
US 2013/0103315 A1 Apr. 25, 2013

(51) Int. Cl.
G01C 21/00 (2006.01)
G01C 21/36 (2006.01)
H04W 72/00 (2009.01)
G06Q 30/02 (2012.01)

(52) U.S. Cl.
CPC ........ G01C 21/3697 (2013.01); *G06Q 30/0236* (2013.01); *H04W 72/00* (2013.01)

(58) Field of Classification Search
CPC .............. G01C 21/3697; H04W 72/00; G06Q 30/0236
USPC ......... 701/410, 414, 420, 425, 426, 467, 487, 701/533, 538
See application file for complete search history.

(56) References Cited

U.S. PATENT DOCUMENTS

| | | | |
|---|---|---|---|
| 4,819,174 A * | 4/1989 | Furuno et al. | 701/431 |
| 5,931,888 A * | 8/1999 | Hiyokawa | 701/428 |
| 6,944,539 B2 * | 9/2005 | Yamada et al. | 701/428 |
| 7,038,637 B1 | 5/2006 | Eller et al. | |
| 8,024,317 B2 | 9/2011 | Nair et al. | |
| 2006/0236258 A1 * | 10/2006 | Othmer et al. | 715/774 |
| 2008/0248815 A1 * | 10/2008 | Busch | 455/456.5 |
| 2010/0020752 A1 | 1/2010 | Anschutz et al. | |
| 2012/0290383 A1 * | 11/2012 | Busch | 705/14.36 |

* cited by examiner

*Primary Examiner* — Gertrude Arthur Jeanglaude
(74) *Attorney, Agent, or Firm* — IP Investment Law Group

(57) ABSTRACT

A method of operation of a navigation system includes: generating a navigation route for displaying on a device; estimating a public display location along the navigation route; and scheduling a location-based notification to be presented at the public display location and prior to traversing the navigation route.

20 Claims, 7 Drawing Sheets

NAVIGATION SYSTEM WITH LOCATION ESTIMATION MECHANISM AND METHOD OF OPERATION THEREOF

TECHNICAL FIELD

The present invention relates generally to a navigation system, and more particularly to a system for a navigation system with location estimation.

BACKGROUND ART

Modern portable consumer and industrial electronics provide increasing levels of functionality to support modern life including navigation services. This is especially true for client devices such as navigation systems, cellular phones, portable digital assistants, and multifunction devices.

The navigation systems generally provide a recommended route to a desired destination. Generally, the recommended route and the desired destination are selected from a large database of roads stored in mass media storage, such as a compact disc read-only memory (CD ROM) or a hard drive, which includes roads of an area to be traveled by a user. The navigation systems can also notify waypoints or times along the route.

As users adopt mobile navigation service devices, new and old usage begin to take advantage of this new device space. Navigation system and service providers are continually making improvement to enhance the user's experience in order to be competitive.

Thus, a need still remains for a navigation system with location estimation mechanism for increasing levels of functionality. In view of ease of use, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: generating a navigation route for displaying on a device; estimating a public display location along the navigation route; and scheduling a location-based notification to be presented at the public display location and prior to traversing the navigation route.

The present invention provides a navigation system, including: a navigation module for generating a navigation route for displaying on a device; an identify location module, coupled to the navigation module, for estimating a public display location along the navigation route; and a schedule notification module, coupled to the identify location module, for scheduling a location-based notification to be presented at the public display location and prior to traversing the navigation route.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
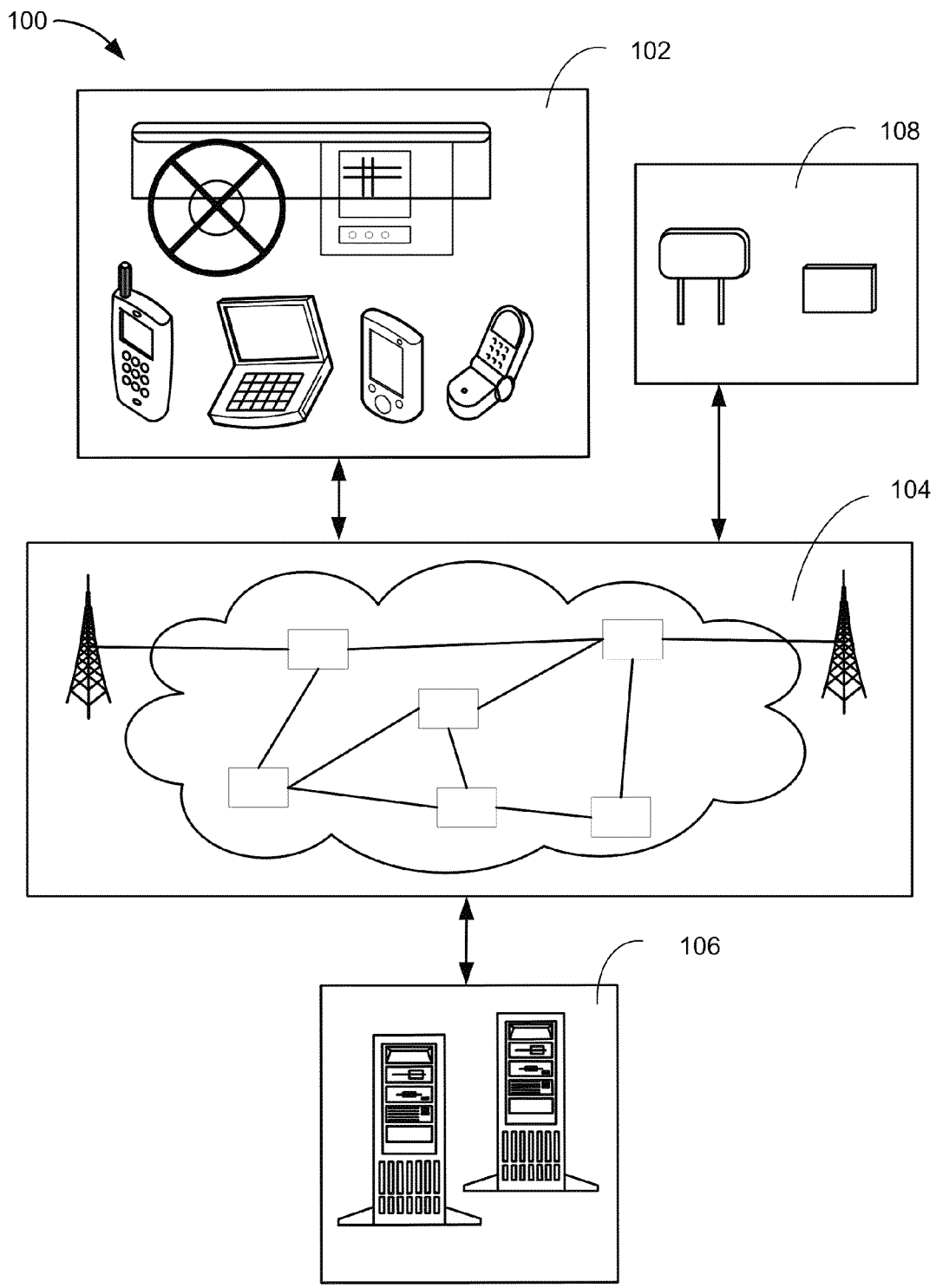
FIG. 1 is a navigation system with location estimation mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with location estimation mechanism in an embodiment of the present invention. The navigation system 100 includes a first device 102, such as a client or a server, connected to a second device 106, such as a client or server, with a communication path 104, such as a wireless or wired network.

The navigation system 100 includes a public display system 108, which is defined as an electronics system, connected to the first device 102 and the second device 106 with the communication path 104.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the public display system 108, the second device 106, and the first device 102 as end points of the communication path 104, although it is understood that the navigation system 100 can have a different partition between the first device 102, the second device 106, the public display system 108, and the communication path 104. For example, the first device 102, the second device 106, the public display system 108, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

The public display system 108 can be stationary, attached to a vehicle, or mounted on a moving object. Contents on a display of the public display system 108 can be viewed from a location where the first device 102 is located.

For example, the public display system 108 can be of any of a variety of media output devices, such as an electronics billboard, a flat panel display, a projector, a video screen, a speaker, or a combination thereof. As a specific example, the public display system 108 can represent an electronics billboard on a side of a road or a flat screen on a wall in a mall or in an airport. As another specific example, the public display system 108 can represent a screen mounted on a moving bus or attached to a back of a car.

Figure 2:
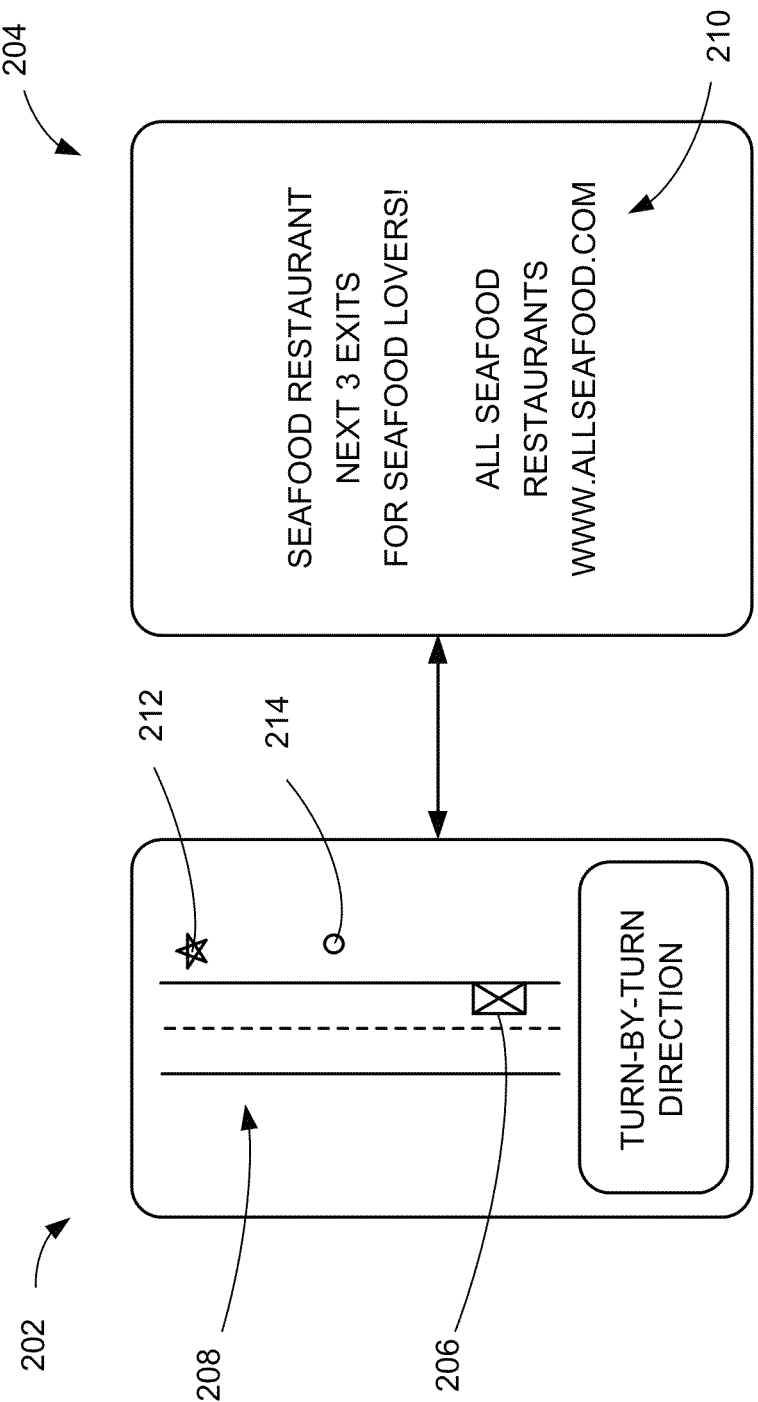
FIG. 2 is an example of a display on a first device display interface of the first device of FIG. 1 and another display on a public display interface of the public display system of FIG. 1.

Referring now to FIG. 2, therein is shown an example of a display on a first device display interface 202 of the first device 102 of FIG. 1 and another display on a public display interface 204 of the public display system 108 of FIG. 1. The public display interface 204 can represent an additional display interface.

For example, the location-based information can be a map, a street name, a turn-by-turn instruction, or any relevant information for navigation purposes. Also for example, the location-based information can represent a message associated with a point location based on user preferences.

The first device display interface 202 and the public display interface 204 are defined as electronic devices that present the location-based information in a visual form. The first device display interface 202 and the public display interface 204 can include a display device, a projector, a video screen, or any combination thereof.

The first device display interface 202 can present a current location 206 along a navigation route 208. The current location 206 is defined as a geographic position where the first device 102 or a vehicle is located. The navigation route 208 is defined as a path for travel from an origin to a destination.

The public display interface 204 can present a location-based notification 210, which is defined as a message related to a point of interest 212. The point of interest 212 is defined as a specific point location along the navigation route 208 being traversed by a user utilizing the navigation system 100. The public display interface 204 can include a number of display sections for supporting a number of the location-based notification 210.

For example, the location-based notification 210 is shown as "SEAFOOD RESTAURANT NEXT 3 MILES FOR SEAFOOD LOVERS . . . " to provide information related to a seafood restaurant as the point of interest 212. Also for example, the point of interest 212 can represent a business located in an area along the navigation route 208.

The location-based notification 210 is shown in a textual representation, although it is understood that the location-based notification 210 can be presented with any visual, audible, or mechanical means. For example, the location-based notification 210 can be presented with text, images, audio, video, graphics, vibration, or a combination thereof.

The location-based notification 210 can be presented at a public display location 214, which is defined as a geographic location of the public display system 108. The public display location 214 can be calculated to be within a geographic area along the navigation route 208.

The location-based notification 210 can be presented when the current location 206 is within a predetermined area from the public display location 214. Generation of the location-based notification 210 will be described in more details in a subsequent section.

Figure 3:
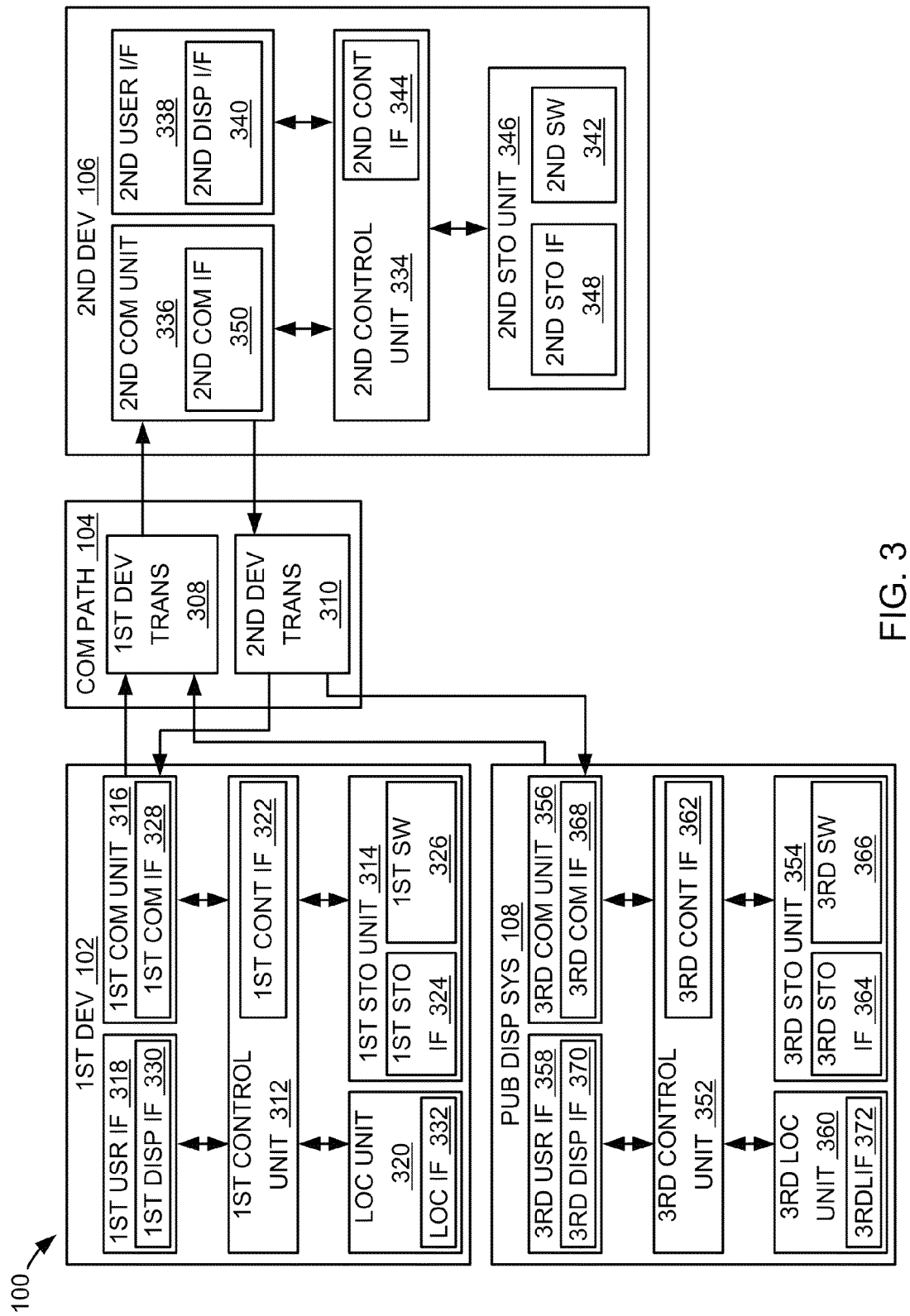
FIG. 3 is an exemplary block diagram of the navigation system.

Referring now to FIG. 3, therein is shown an exemplary block diagram of the navigation system 100. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, a first user interface 318, and a location unit 320. The first control unit 312 can include a first control interface 322. The first control unit 312 can execute a first software 326 to provide the intelligence of the navigation system 100.

The first control unit 312 can be implemented in a number of different manners. For example, the first control unit 312 can be a processor, an embedded processor, a microprocessor, a hardware control logic, a hardware finite state machine (FSM), a digital signal processor (DSP), or a combination thereof.

The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial navigation system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations external to the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information, such as advertisements, points of interest (POI), navigation routing entries, or any combination thereof.

The first storage unit 314 can be a volatile memory, a nonvolatile memory, an internal memory, an external memory, or a combination thereof. For example, the first storage unit 314 can be a nonvolatile storage such as nonvolatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, or any combination thereof to provide data and communication inputs.

The first user interface 318 can include a first display interface 330. The first display interface 330 can include a display, a projector, a video screen, a speaker, or any combination thereof. The first display interface 330 can be represented by the first device display interface 202 of FIG. 2.

The first control unit 312 can operate the first user interface 318 to display information generated by the navigation system 100. The first control unit 312 can also execute the first software 326 for the other functions of the navigation system 100, including receiving location information from the location unit 320. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second control interface 344 can also be used for communication that is external to the second device 106.

The second control interface 344 can receive information from the other functional units or from external sources, or can transmit information to the other functional units or to external destinations. The external sources and the external destinations refer to sources and destinations external to the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest (POI), navigation routing entries, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as nonvolatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. In addition, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 320, although it is understood that the second device 106 can also operate the location unit 320.

The public display system 108 can send information in the first device transmission 308 over the communication path 104 to the second device 106. For illustrative purposes, the public display system 108 is shown communicating with the second device 106, although it is understood that the public display system 108 can also communicate with the first device 102 through the communication path 104.

For brevity of description in this embodiment of the present invention, the public display system 108 will be described as a client device and the second device 106 will be described as a server device. The present invention is not limited to this selection for the type of devices. The selection is an example of the present invention.

The public display system 108 can include a third control unit 352, a third storage unit 354, a third communication unit 356, a third user interface 358, and a third location unit 360. The third control unit 352 can include a third control interface 362. The third control unit 352 can execute a third software 366 to provide the intelligence of the navigation system 100.

The third control unit 352 can be implemented in a number of different manners. For example, the third control unit 352 can be a processor, an embedded processor, a microprocessor, a hardware control logic, a hardware finite state machine (FSM), a digital signal processor (DSP), or a combination thereof.

The third control interface 362 can be used for communication between the third control unit 352 and other functional units in the public display system 108. The third control interface 362 can also be used for communication that is external to the public display system 108.

The third control interface 362 can receive information from the other functional units or from external sources, or can transmit information to the other functional units or to external destinations. The external sources and the external destinations refer to sources and destinations external to the public display system 108.

The third control interface 362 can be implemented in different ways and can include different implementations depending on which functional units or external units are being interfaced with the third control interface 362. For example, the third control interface 362 can be implemented with a pressure sensor, an inertial sensor, a microelectromechanical system (MEMS), optical circuitry, waveguides, wireless circuitry, wireline circuitry, or a combination thereof.

The third location unit 360 can generate location information, current heading, and current speed of the public display system 108, as examples. The third location unit 360 can be implemented in many ways. For example, the third location unit 360 can function as at least a part of a global positioning system (GPS), an inertial navigation system, a cellular-tower location system, a pressure location system, or any combination thereof.

The third location unit 360 can include a third location interface 372. The third location interface 372 can be used for communication between the third location unit 360 and other functional units in the public display system 108. The third location interface 372 can also be used for communication that is external to the public display system 108.

The third location interface 372 can receive information from the other functional units or from external sources, or can transmit information to the other functional units or to external destinations. The external sources and the external destinations refer to sources and destinations external to the public display system 108.

The third location interface 372 can include different implementations depending on which functional units or external units are being interfaced with the third location unit 360. The third location interface 372 can be implemented with technologies and techniques similar to the implementation of the third control interface 362.

The third storage unit 354 can store the third software 366. The third storage unit 354 can also store the relevant information, such as advertisements, points of interest (POI), navigation routing entries, or any combination thereof.

The third storage unit 354 can be a volatile memory, a nonvolatile memory, an internal memory, an external memory, or a combination thereof. For example, the third storage unit 354 can be a nonvolatile storage such as non-volatile random access memory (NVRAM), Flash memory, disk storage, or a volatile storage such as static random access memory (SRAM).

The third storage unit 354 can include a third storage interface 364. The third storage interface 364 can be used for communication between the third location unit 360 and other functional units in the public display system 108. The third storage interface 364 can also be used for communication that is external to the public display system 108.

The third storage interface 364 can receive information from the other functional units or from external sources, or can transmit information to the other functional units or to external destinations. The external sources and the external destinations refer to sources and destinations external to the public display system 108.

The third storage interface 364 can include different implementations depending on which functional units or external units are being interfaced with the third storage unit 354. The third storage interface 364 can be implemented with technologies and techniques similar to the implementation of the third control interface 362.

The third communication unit 356 can enable external communication to and from the public display system 108. For example, the third communication unit 356 can permit the public display system 108 to communicate with the second device 106, an attachment, such as a peripheral device or a computer desktop, and the communication path 104.

The third communication unit 356 can also function as a communication hub allowing the public display system 108 to function as part of the communication path 104 and not limited to be an end point or terminal unit to the communication path 104. The third communication unit 356 can include active and passive components, such as microelectronics or an antenna, for interaction with the communication path 104.

The third communication unit 356 can include a third communication interface 368. The third communication interface 368 can be used for communication between the third communication unit 356 and other functional units in the public display system 108. The third communication interface 368 can receive information from the other functional units or can transmit information to the other functional units.

The third communication interface 368 can include different implementations depending on which functional units are being interfaced with the third communication unit 356. The third communication interface 368 can be implemented with technologies and techniques similar to the implementation of the third control interface 362.

The third user interface 358 allows a user (not shown) to interface and interact with the public display system 108. The third user interface 358 can include an input device and an output device. Examples of the input device of the third user interface 358 can include a keypad, a touchpad, soft-keys, a keyboard, a microphone, or any combination thereof to provide data and communication inputs.

The third user interface 358 can include a third display interface 370. The third display interface 370 can include a display, a projector, a video screen, a speaker, or any combination thereof. The third display interface 370 can be represented by the public display interface 204 of FIG. 2.

The third control unit 352 can operate the third user interface 358 to display information generated by the navigation system 100. The third control unit 352 can also execute the third software 366 for the other functions of the navigation system 100, including receiving location information from the third location unit 360. The third control unit 352 can further execute the third software 366 for interaction with the communication path 104 via the third communication unit 356.

Figure 4:
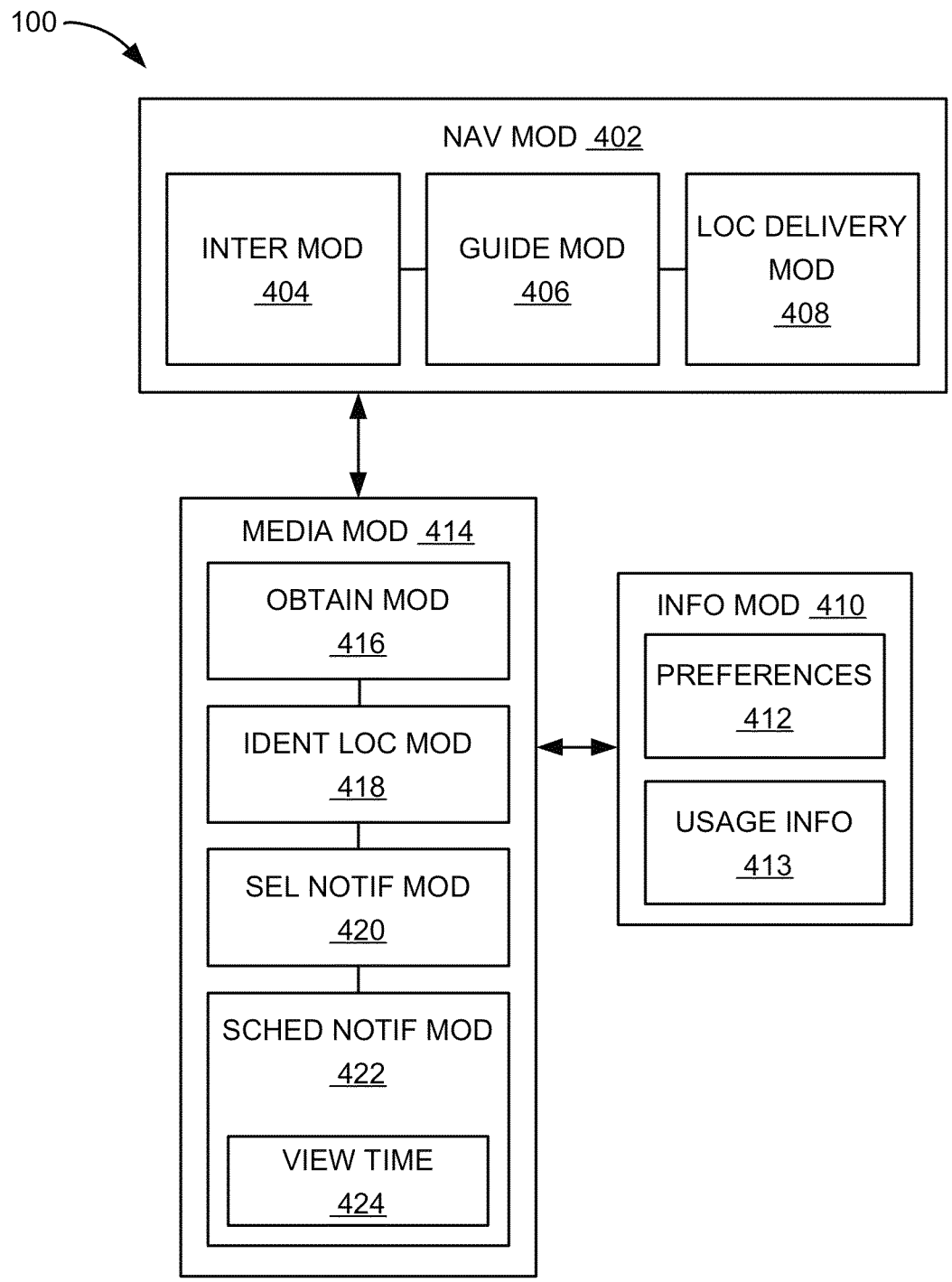
FIG. 4 is a control flow of the navigation system.

Referring now to FIG. 4, therein is shown a control flow of the navigation system 100. The navigation system 100 can represent a media scheduling and delivery system to media-output devices in the path of a user based on the user's navigation data and personal preferences.

The navigation system 100 can include a navigation module 402, which is defined as a module that generates the navigation route 208 of FIG. 2 for route guidance. The navigation module 402 can include an interact module 404, which is defined as a module that provides an interface for receiving an origin and a destination from the user.

The navigation module 402 can include a guide module 406, which is defined as a module that generates navigation information. The guide module 406 can calculate the navigation route 208 from the origin to the destination. The guide module 406 can calculate the current location 206 of FIG. 2 along the navigation route 208.

The navigation route 208 can be pre-planned or calculated before the user leaves the origin. The navigation route 208 can be re-calculated when the current location 206 is beyond a predetermined distance away from the navigation route 208 such that the navigation route 208 that was previously calculated is no longer optimal.

The navigation module 402 can include a location delivery module 408, which is defined as a module that stores the current location 206 and the navigation route 208. The location delivery module 408 pushes or sends the current location 206 and the navigation route 208 to other modules for further processing. For example, the current location 206 and the navigation route 208 can represent geo-information.

The navigation system 100 can include an information module 410, which is defined as a module that receives and stores preferences 412, usage information 413, or a combination thereof. The preferences 412 are defined as predefined settings that are configured or selected by the user for navigation purposes. The usage information 413 is defined as navigation historical data. The usage information 413 can be used alone or in combination with the preferences 412. The information module 410 can store and provide the preferences 412, the usage information 413, or a combination thereof to other modules for further processing.

For example, the preferences 412 can include favorite places, preferred types of point of interests (POIs), highway-only or street-only selection, streets with least number of school zones or least amount of traffic, and routes with least number of accidents or constructions. Also for example, the usage information 413 can include navigation historical data or relevant information including most frequently visited locations, past queries extracted from searches performed that are associated with points of interest, and places visited when the navigation route 208 was previously traveled. Further, for example, the preferences 412, the usage information 413, or a combination thereof can be used to select the point of interest 212 of FIG. 2 based on the user's calendar, trip itinerary, diet preference, and review ratings.

The navigation system 100 can include a media module 414, which is defined as a module that generates location-based information associated with navigation information. The location delivery module 408 can send the current location 206 and the navigation route 208 to the media module 414 for further processing. The information module 410 can send the preferences 412, the usage information 413, or a combination thereof to the media module 414 for further processing.

The media module 414 can include an obtain module 416, which is defined as a module that interfaces with the location delivery module 408 and the information module 410. The obtain module 416 can receive the current location 206 and the navigation route 208 from the location delivery module 408. The obtain module 416 can receive the preferences 412, the usage information 413, or a combination thereof from the information module 410 to determine the user's personal preferences.

The media module 414 can include an identify location module 418, which is defined as a module that estimates the public display location 214 of FIG. 2. The public display location 214 is a geolocation or a geographic location of the public display system 108 of FIG. 1. The public display location 214 is scheduled or selected in advance prior to the vehicle arriving at the public display location 214, the user of the navigation system 100 begins traveling along the navigation route 208, or a combination thereof.

The public display location 214 is estimated by the identify location module 418 selecting a location associated with the navigation route 208. The public display location 214 is estimated to be within a geographic area along the navigation route 208. The term "within a geographic area" referred to herein means a location, along the navigation route 208, at which information on the public display system 108 is clearly and safely viewed without obstruction and with no risk of having accidents. The public display interface 204 of FIG. 2 can be viewed without viewing problems and without getting into any collisions when the current location 206 is at or near the public display location 214 along the navigation route 208.

The public display location 214 is identified to be a location such that sufficient amount of time is provided for the information on the public display system 108 to be viewed. The sufficient amount of time is determined based on speed, lighting, traffic conditions, weather conditions, or a combination thereof. For example, if an average travel speed of a vehicle approaching the public display location 214 is increased, a number of time units allocated for displaying the location-based notification 210 of FIG. 2 on the public display interface 204 is increased so that the location-based notification 210 is displayed at the number of time units prior to the vehicle arriving at the public display location 214.

The media module 414 can include a select notification module 420, which is defined as a module that determines the location-based notification 210. The select notification module 420 selects the location-based notification 210 related to the point of interest 212 based on the preferences 412, the usage information 413, or a combination thereof. In other words, the select notification module 420 selects the location-based notification 210 with information that matches the preferences 412, the usage information 413, or a combination thereof. The location-based notification 210 can be generated before the current location 206 is at or near the public display system 108 to solve the problem of scheduling in real-time.

For example, the location-based notification 210 can be determined based on the user's preferred products offered by businesses located in an area along the navigation route 208. Also for example, the location-based notification 210 can include an appropriate advertisement of a business.

The media module 414 can include a schedule notification module 422, which is defined as a module that schedules when the location-based notification 210 is to be presented on the public display system 108. The location-based notification 210 can be scheduled to be displayed at the public display location 214 prior to the navigation route 208 traversed and before the current location 206 is at or near the public display location 214 to solve the problem of scheduling in real-time. The schedule notification module 422 can push or send the location-based notification 210 to the public display system 108.

The schedule notification module 422 estimates a view time 424, which is defined as a time when the location-based notification 210 is to be displayed before the current location 206 of the vehicle is at or near the public display location 214. The schedule notification module 422 can send the location-based notification 210 to the public display system 108 so that the location-based notification 210 can be displayed on the public display system 108 at the view time 424.

The view time 424 is an actual time of day that provides the sufficient amount of time for viewing the location-based notification 210. The view time 424 allows the location-based notification 210 to be viewed before the vehicle passes by the public display system 108.

The schedule notification module 422 estimates the view time 424 by speed, lighting, traffic conditions, weather conditions, or a combination thereof. The schedule notification module 422 also estimates the view time 424 by compensating for optimal contrast for easier reading according to time of day when the vehicle approaches the public display system 108. For example, the time of day can be used to indicate dawn, dusk, noon, or nighttime.

The schedule notification module 422 estimates the view time 424 by compensating for rates at which the public display location 214 and the current location 206 are changed. The rates can be compensated by taking into account a speed difference or a relative speed of moving vehicles or objects in a case where the public display location 214 is a position of one of the moving vehicles or objects to or on which the public display system 108 is attached or mounted.

The schedule notification module 422 estimates the view time 424 by compensating for a direction change. For example, the direction change can be compensated for when the vehicle or the current position 206 deviates or moves away from a previously planned route, such as the navigation route 208.

Also for example, the direction change can be compensated for in a case of a moving vehicle, for which a position is identified by the current position 206, and another moving vehicle, for which a position is identified by the public display location 214 since the public display system 108 is attached to or mounted on the another moving vehicle. In this example, the direction change is a resulting direction or a direction difference between travel directions of the moving vehicle and the another moving vehicle.

The media module 414 can be coupled to the navigation module 402 and the information module 410. The guide module 406 can be coupled to the interact module 404 and the location delivery module 408. The identify location module 418 can be coupled to the obtain module 416 and the select notification module 420 coupled to the schedule notification module 422.

The interact module 404 can be implemented with the first control unit 312 of FIG. 3, the first storage unit 314 of FIG. 3, the first communication unit 316 of FIG. 3, the first user interface 318 of FIG. 3, the second control unit 334 of FIG. 3, the second communication unit 336 of FIG. 3, the second user interface 338 of FIG. 3, and the second storage unit 346 of FIG. 3. For example, the first user interface 318 or the second user interface 338 can be implemented to receive the origin and the destination.

The guide module 406 can be implemented with the first control unit 312, the first storage unit 314, the first communication unit 316, the first user interface 318, the location unit 320 of FIG. 3, the second control unit 334, the second communication unit 336, the second user interface 338, and the second storage unit 346. For example, the first control unit 312, the first storage unit 314, the location unit 320, the second control unit 334, the second storage unit 346, or a combination thereof can be implemented to calculate the current location 206 and the navigation route 208.

The location delivery module 408 can be implemented with the first control unit 312, the first storage unit 314, the first communication unit 316, the second control unit 334, the second communication unit 336, and the second storage unit 346. For example, the first control unit 312, the first storage unit 314, the first communication unit 316, the second control unit 334, the second communication unit 336, the second storage unit 346, or a combination thereof can be implemented to store and send the current location 206 and the navigation route 208 to other modules for further processing.

The information module 410 can be implemented with the first control unit 312, the first storage unit 314, the first communication unit 316, the first user interface 318, the second control unit 334, the second communication unit 336, the second user interface 338, and the second storage unit 346. For example, the first control unit 312, the first storage unit 314, the first communication unit 316, the first user interface 318, the second control unit 334, the second communication unit 336, the second user interface 338, the second storage unit 346, or a combination thereof can be implemented to store and provide the preferences 412, the usage information 413, or a combination thereof to other modules for further processing.

The obtain module 416 can be implemented with the first control unit 312, the first storage unit 314, the first communication unit 316, the second control unit 334, the second communication unit 336, the second user interface 338, and the second storage unit 346. For example, the first control unit 312, the first storage unit 314, the first communication unit 316, the second control unit 334, the second communication unit 336, the second user interface 338, the second storage unit 346, or a combination thereof can be implemented to interface with the information module 410 to receive the preferences 412, the usage information 413, or a combination thereof.

The identify location module 418 can be implemented with the second control unit 334, the second communication unit 336, the second user interface 338, the second storage unit 346, the third control unit 352 of FIG. 3, the third storage unit 354 of FIG. 3, the third communication unit 356 of FIG. 3, and the third location unit 360 of FIG. 3. For example, the second control unit 334, the second communication unit 336, the second user interface 338, the second storage unit 346, the third control unit 352, the third storage unit 354, the third communication unit 356, the third location unit 360, or a combination thereof can be implemented to estimate the public display location 214.

The select notification module 420 can be implemented with the second control unit 334, the second communication unit 336, the second user interface 338, the second storage unit 346, the third control unit 352, the third storage unit 354, the third communication unit 356, and the third location unit 360. For example, the second control unit 334, the second communication unit 336, the second user interface 338, the second storage unit 346, the third control unit 352, the third storage unit 354, the third communication unit 356, the third location unit 360, or a combination thereof can be implemented to determine the location-based notification 210.

The schedule notification module 422 can be implemented with the second control unit 334, the second communication unit 336, the second user interface 338, the second storage unit 346, the third control unit 352, the third storage unit 354, the third communication unit 356, and the third location unit 360. For example, the second control unit 334, the second communication unit 336, the second user interface 338, the second storage unit 346, the third control unit 352, the third storage unit 354, the third communication unit 356, the third location unit 360, or a combination thereof can be implemented to schedule when the location-based notification 210 is to be presented or to estimate the view time 424.

It has been discovered that delivering appropriate media, such as the location-based notification 210, to media-output devices, such as the public display system 108, that are in the path of the user's navigation, such as the navigation route 208, using navigation data from the navigation module 402 and the preferences 412, the usage information 413, or a combination thereof solves problem of scheduling in real-time since the public display location 214 and a location of the point of interest 212 are calculated prior to the navigation route 208 traversed.

It has also been discovered that the location-based notification 210 presented on the public display system 108 provides a benefit for other users also travelling on the navigation route 208 to view the location-based notification 210 as well besides the user with the preferences 412, the usage information 413, or a combination thereof.

It has further been discovered that the schedule notification module 422 scheduling when the location-based notification 210 is to be presented provides an advantage with more time to select better notification, such as the location-based notification 210, since the location-based notification 210 is scheduled ahead of time before the current location 206 is at or near the public display system 108.

It has yet further been discovered that the identify location module 418 estimating the public display location 214 associated with the navigation route 208 in advance allows more time to process more data for selecting the location-based notification 210 before the current location is at or near the public display system 108.

It has yet further been discovered that the schedule notification module 422 scheduling a number of the location-based notification 210 in advance allows multiple messages to be displayed on the public display interface 204 since there is more time to select multiple messages.

It has yet further been discovered that presenting the location-based notification 210 on the public display interface 204 as the navigation route 208 is traversed eliminates dependency on the first device display interface 202 of FIG. 2 providing improved navigation in delivering multimedia messages, such as the location-based notification 210, since a screen size of a GPS device in car, such as the first device 102 of FIG. 1, is smaller than that of the public display system 108.

It has yet further been discovered that the select notification module 420 selecting the location-based notification 210 provides improved ease-of-use because the location-based notification 210 is generated based on the preferences 412, the usage information 413, or a combination thereof.

The physical transformation of the location-based notification 210 to be presented on the public display system 108 results in movement in the physical world, such as people using the first device 102, the second device 106 of FIG. 1, the public display system 108, or vehicles to travel to the point of interest 212, based on the operation of the navigation system 100. As the movement in the physical world occurs, the movement itself creates additional information that is converted back to re-calculate the navigation route 208 for the continued operation of the navigation system 100 and to continue the movement in the physical world.

Figure 5:
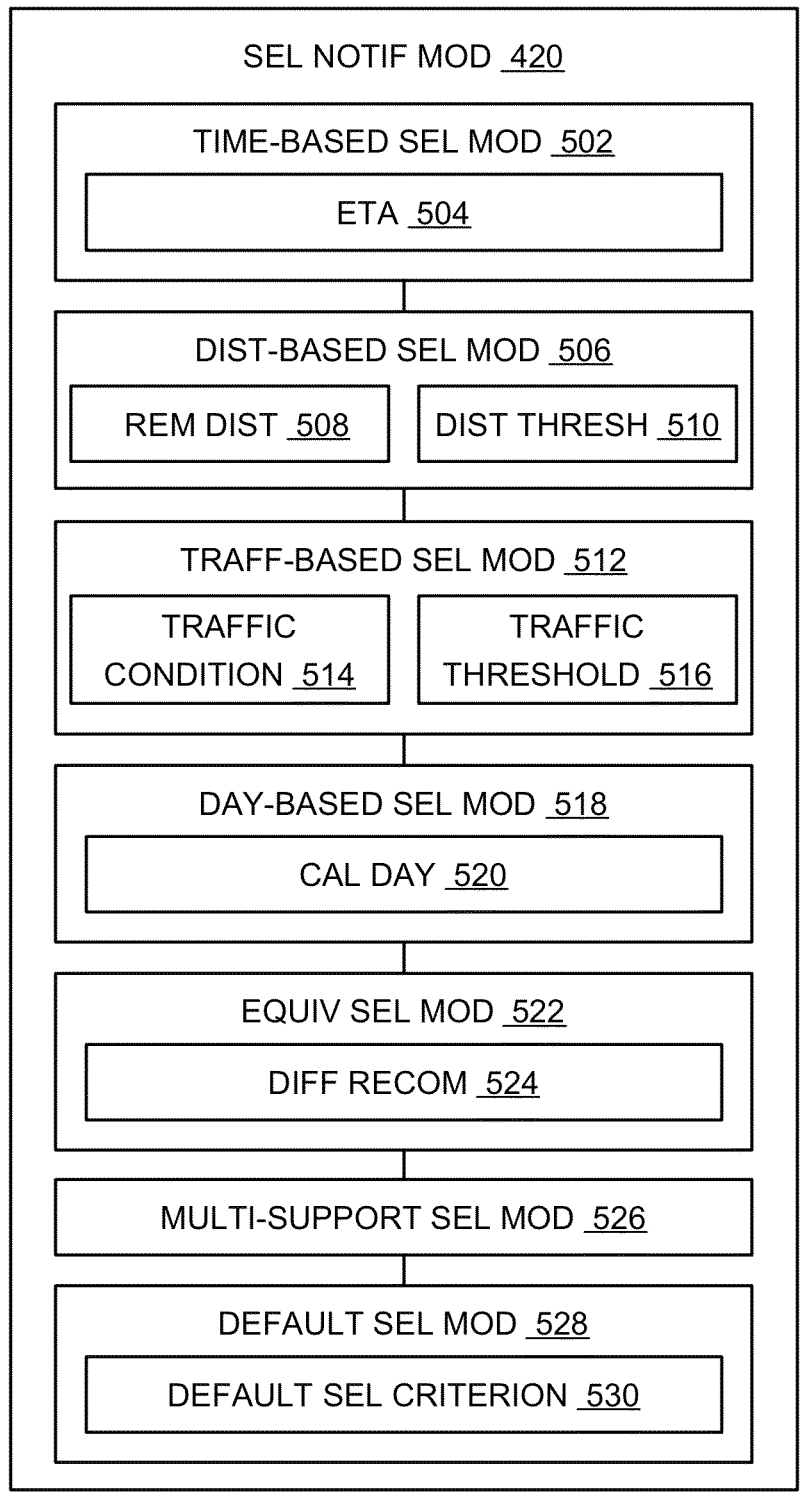
FIG. 5 is a control flow of the select notification module.

Referring now to FIG. 5, therein is shown a control flow of the select notification module 420. The select notification module 420 can include a time-based selection module 502, which is defined as a module that identifies the location-based notification 210 of FIG. 2 based on an estimated time of arrival 504. The estimated time of arrival 504 is defined as a certain time during a day when the current location 206 of FIG. 2 is estimated to be at or near the point of interest 212 of FIG. 2. Based on the estimated time of arrival 504, the time-based selection module 502 can identify the location-based notification 210 if the estimated time of arrival 504 is during hours of operation of the point of interest 212. The estimated time of arrival 504 is calculated by estimating a time to travel from the current location 206 to the public display location 214 of FIG. 2 and a time to travel from the public display location 214 to the point of interest 212.

The select notification module 420 can include a distance-based selection module 506, which is defined as a module that identifies the location-based notification 210 based on a comparison of a remaining distance 508 and a distance threshold 510. The remaining distance 508 is defined as a distance from the current location 206 to the public display location 214 and a distance from the public display location 214 to the point of interest 212. The distance threshold 510 is defined as a preset distance value for purposes of selecting the location-based notification 210.

The distance threshold 510 can be configured or determined in the navigation system 100 prior to the navigation route 208 of FIG. 2 is traversed. If the remaining distance 508 is greater than the distance threshold 510, the distance-based selection module 506 does not identify the location-based notification 210 since the point of interest 212 is too far from the navigation route 208. If the remaining distance 508 is less than or equal to the distance threshold 510, the distance-based selection module 506 can identify the location-based notification 210 since the point of interest 212 is close to the navigation route 208.

The select notification module 420 can include a traffic-based selection module 512, which is defined as a module that identifies the location-based notification 210 based on a comparison of a traffic condition 514 and a traffic threshold 516. The traffic condition 514 is defined as an estimated number of vehicles travelled per unit area or per unit of time along a route from the current location 206 to the point of interest 212. The traffic condition 514 is estimated at a time of a day before the current location is at or near the public display location 214. The traffic threshold 516 is defined as a preset number of vehicles per a unit of time.

The traffic condition 514 can indicate how congested the route is. If the traffic condition 514 is greater than the traffic threshold 516, the traffic-based selection module 512 does not identify the location-based notification 210 since it is congested on the route. If the traffic condition 514 is less than or equal to the traffic threshold 516, the traffic-based selection module 512 can identify the location-based notification 210 since it is not congested on the route.

The select notification module 420 can include a day-based selection module 518, which is defined as a module that identifies the location-based notification 210 based on a calendar day 520. The calendar day 520 is defined as a day of a calendar year when the navigation route 208 is traversed. For example, the calendar day 520 can include a weekday, a weekend, or a holiday.

As an example, if the calendar day 520 is a weekend or a holiday, the day-based selection module 518 does not identify the location-based notification 210 since the point of interest 212 is close on weekends and holidays. As another example, if the calendar day 520 is a weekday, the day-based selection module 518 can identify the location-based notification 210 since the point of interest 212 is open on weekdays.

The select notification module 420 can include an equivalence selection module 522, which is defined as a module that identifies the location-based notification 210 for a different recommendation 524. The different recommendation 524 is defined as an option that is not the same as but similar to the preferences 412 of FIG. 4, the usage information 413 of FIG. 4, or a combination thereof.

For example, the different recommendation 524 can include an alternative product. Also for example, the different recommendation 524 can include a different option that is substantially the same or better than the preferences 412, the usage information 413, or a combination thereof. Further, for example, the different recommendation 524 can be better than an inquired product in terms of providing a cost saving, an enhanced quality, an improved service, an ease of use, or any characteristic that provides a benefit compared to the inquired product.

The select notification module 420 can include a multiple-support selection module 526, which is defined as a module that identifies a number of the location-based notification 210 for a number of the point of interest 212. The multiple-support selection module 526 can be identified to support different preferences. The multiple-support selection module 526 can send the number of the location-based notification 210 to the public display system 108 of FIG. 1 so that the number of the location-based notification 210 can be presented on the public display interface 204 of FIG. 2.

The number of the location-based notification 210 can be identified based on an arbitration, which is defined as a process that determines a selection based on a specific decision criterion. For example, the arbitration method can include selection based on majority voting or affinity grouping such that the location-based notification 210 is identified for a majority of preferences that are the same or similar. Also for example, the arbitration method can include selection based on types of foods including meat and vegetable.

The select notification module 420 can include a default selection module 528, which is defined as a module that identifies the location-based notification 210 based on a default selection criterion 530. The default selection criterion 530 is defined as a preset point of comparison that is used as a basis for selecting the location-based notification 210. For example, the default selection criterion 530 can include any local specialty offerings and review ratings.

The default selection criterion 530 can be used when none of the previously described modules of the select notification module 420 is or can be used. The default selection criterion 530 can also be used when the multiple-support selection module 526 is not able to determine the location-based notification 210 for two groups of users, each with a different preference, but with the same number of users in each group.

For illustration purposes, the select notification module 420 is shown with the modules in the order described above, although it is understood that the select notification module 420 can be implemented in any order. For example, the select notification module 420 can be implemented with the distance-based selection module 506 executed before the time-based selection module 502.

The distance-based selection module 506 can be coupled to the time-based selection module 502 and the traffic-based selection module 512. The day-based selection module 518 can be coupled to the traffic-based selection module 512 and the equivalence selection module 522. The multiple-support selection module 526 can be coupled to the equivalence selection module 522 and the default selection module 528.

The time-based selection module 502 can be implemented with the second control unit 334 of FIG. 3, the second communication unit 336 of FIG. 3, the second user interface 338 of FIG. 3, the second storage unit 346 of FIG. 3, the third control unit 352 of FIG. 3, the third storage unit 354 of FIG. 3, the third communication unit 356 of FIG. 3, and the third location unit 360 of FIG. 3. For example, the second control unit 334, the second communication unit 336, the second user interface 338, the second storage unit 346, the third control unit 352, the third storage unit 354, the third communication unit 356, the third location unit 360, or a combination thereof can be implemented to identify the location-based notification 210 based on the estimated time of arrival 504.

The distance-based selection module 506 can be implemented with the second control unit 334, the second communication unit 336, the second user interface 338, the second storage unit 346, the third control unit 352, the third storage unit 354, the third communication unit 356, and the third location unit 360. For example, the second control unit 334, the second communication unit 336, the second user interface 338, the second storage unit 346, the third control unit 352, the third storage unit 354, the third communication unit 356, the third location unit 360, or a combination thereof can be implemented to identify the location-based notification 210 based on a comparison of the remaining distance 508 and the distance threshold 510.

The traffic-based selection module 512 can be implemented with the second control unit 334, the second communication unit 336, the second user interface 338, the second storage unit 346, the third control unit 352, the third storage unit 354, the third communication unit 356, and the third location unit 360. For example, the second control unit 334, the second communication unit 336, the second user interface 338, the second storage unit 346, the third control unit 352, the third storage unit 354, the third communication unit 356, the third location unit 360, or a combination thereof can be implemented to identify the location-based notification 210 based on a comparison of the traffic condition 514 and the traffic threshold 516.

The day-based selection module 518 can be implemented with the second control unit 334, the second communication unit 336, the second user interface 338, the second storage unit 346, the third control unit 352, the third storage unit 354, the third communication unit 356, and the third location unit 360. For example, the second control unit 334, the second communication unit 336, the second user interface 338, the second storage unit 346, the third control unit 352, the third storage unit 354, the third communication unit 356, the third location unit 360, or a combination thereof can be implemented to identify the location-based notification 210 based on the calendar day 520.

The equivalence selection module 522 can be implemented with the second control unit 334, the second communication unit 336, the second user interface 338, the second storage unit 346, the third control unit 352, the third storage unit 354, the third communication unit 356, and the third location unit 360. For example, the second control unit 334, the second communication unit 336, the second user interface 338, the second storage unit 346, the third control unit 352, the third storage unit 354, the third communication unit 356, the third location unit 360, or a combination thereof can be implemented to identify the location-based notification 210 for the different recommendation 524.

The multiple-support selection module 526 can be implemented with the second control unit 334, the second communication unit 336, the second user interface 338, the second storage unit 346, the third control unit 352, the third storage unit 354, the third communication unit 356, and the third location unit 360. For example, the second control unit 334, the second communication unit 336, the second user interface 338, the second storage unit 346, the third control unit 352, the third storage unit 354, the third communication unit 356, the third location unit 360, or a combination thereof can be implemented to identify a number of the location-based notification 210 for a number of the point of interest 212.

The default selection module 528 can be implemented with the second control unit 334, the second communication unit 336, the second user interface 338, the second storage unit 346, the third control unit 352, the third storage unit 354, the third communication unit 356, and the third location unit 360. For example, the second control unit 334, the second communication unit 336, the second user interface 338, the second storage unit 346, the third control unit 352, the third storage unit 354, the third communication unit 356, the third location unit 360, or a combination thereof can be implemented to identify the location-based notification 210 based on the default selection criterion 530.

It has been discovered that the time-based selection module 502 identifying the location-based notification 210 based on the estimated time of arrival 504 allows a time of arrival at or during hours of operation of the point of interest 212.

It has also been discovered that the distance-based selection module 506 identifying the location-based notification 210 based on a comparison of the remaining distance 508 and the distance threshold 510 prevents navigating too far away from the navigation route 208.

It has further been discovered that the traffic-based selection module 512 identifying the location-based notification 210 based on a comparison of the traffic condition 514 and the traffic threshold 516 reduces the overall travel time by eliminating unnecessary time waiting in heavy traffic.

It has yet further been discovered that the day-based selection module 518 identifying the location-based notification 210 based on the calendar day 520 further reduces the overall travel time by determining if the calendar day 520 is a weekday, a weekend, or a holiday thereby avoiding unnecessary traffic and unnecessary travel time when the point of interest 212 is close.

It has yet further been discovered that the equivalence selection module 522 identifying the location-based notification 210 provides improved ease-of-use by offering the different recommendation 524 for the same or better option than the preferences 412, the usage information 413, or a combination thereof.

It has yet further been discovered that the multiple-support selection module 526 identifying a number of the location-based notification 210 for a number of the point of interest 212 provides benefits for not one but multiple vehicles travelling along the navigation route 208 to receive multimedia messages.

It has yet further been discovered that the default selection module 528 identifying the location-based notification 210 based on the default selection criterion 530 provides improved delivery of messages when none of the previously described modules of the select notification module 420 is applicable and when determining the location-based notification 210 for two groups of users, each with a different preference, but with the same number of users in each group.

Figure 6:
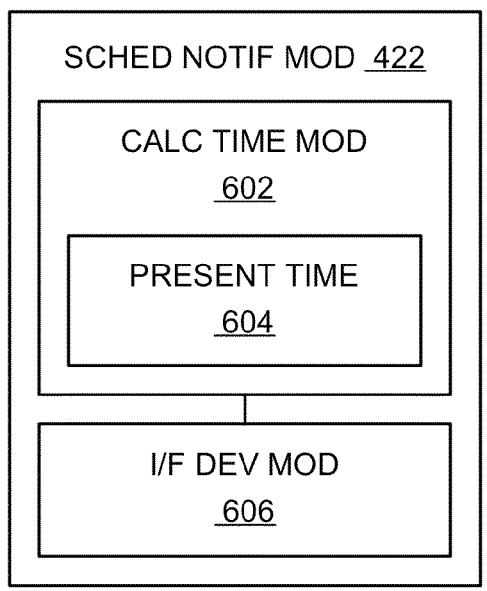
FIG. 6 is a detailed control flow of the schedule notification module.

Referring now to FIG. 6, therein is shown a detailed control flow of the schedule notification module 422. The schedule notification module 422 can schedule the location-based notification 210 of FIG. 2 to be presented while the vehicle is heading towards the public display system 108 of FIG. 1 and before arriving at the public display location 214 of FIG. 2.

The schedule notification module 422 can include a calculate time module 602, which is defined as a module that determines when the location-based notification 210 is to be presented. The calculate time module 602 can generate a presentation time 604, which is a time of day when the location-based notification 210 is to be presented at the public display system 108. The presentation time 604 is also a time of day at which the vehicle is at a predetermined distance before arriving at the public display location 214 such that by the time the vehicle arrives at the public display location 214, the information on the public display system 108 is clearly and safely viewed.

The presentation time 604 can be estimated based on an estimate of a traveling speed of the vehicle, a distance from the current location 206 of FIG. 2 to the public display location 214, or a time duration before the vehicle arrives at the public display location 214. The presentation time 604 can be determined such that there is sufficient amount of time for the location-based notification 210 to be presented before the vehicle arrives at the public display location 214.

The schedule notification module 422 can include an interface device module 606, which is defined as a module that communicates with the public display system 108 and delivers the location-based notification 210 to the public display system 108. The interface device module 606 can be coupled to the calculate time module 602. For example, the interface device module 606 can push or send the location-based notification 210 to the public display system 108 so that the location-based notification 210 can be viewed before the vehicle passes by the public display system 108.

The calculate time module 602 can be implemented with the second control unit 334 of FIG. 3, the second communication unit 336 of FIG. 3, the second user interface 338 of FIG. 3, the second storage unit 346 of FIG. 3, the third control unit 352 of FIG. 3, the third storage unit 354 of FIG. 3, the third communication unit 356 of FIG. 3, and the third location unit 360 of FIG. 3. For example, the second control unit 334, the second communication unit 336, the second user interface 338, the second storage unit 346, the third control unit 352, the third storage unit 354, the third communication unit 356, the third location unit 360, or a combination thereof can be implemented to determine when the location-based notification 210 is to be presented or to generate the presentation time 604.

The interface device module 606 can be implemented with the second control unit 334, the second communication unit 336, the second user interface 338, the second storage unit 346, the third control unit 352, the third storage unit 354, and the third communication unit 356. For example, the second control unit 334, the second communication unit 336, the second user interface 338, the second storage unit 346, the third control unit 352, the third storage unit 354, the third communication unit 356, the third location unit 360, or a combination thereof can be implemented to communicate with the public display system 108 and deliver the location-based notification 210 to the public display system 108.

It has been discovered that the calculate time module 602 generating the presentation time 604 for when the location-based notification 210 is to be presented allows the public display system 108 to be clearly and safely viewed.

It has also been discovered that the interface device module 606 delivering the location-based notification 210 to the public display system 108 provides an effective communication mechanism for presenting the location-based notification 210.

Figure 7:
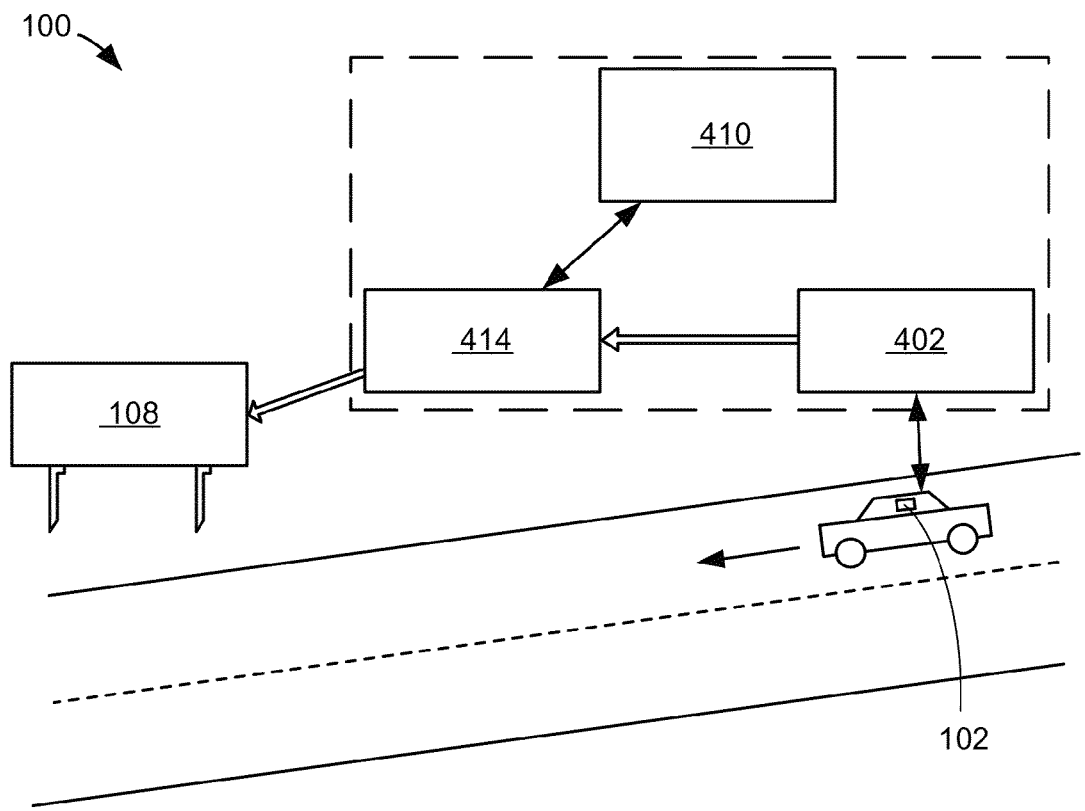
FIG. 7 is an exemplary application diagram of the navigation system.

Referring now to FIG. 7, therein is shown an exemplary application diagram of the navigation system 100. The exemplary application diagram depicts the navigation module 402 interacting with and guiding the vehicle with the first device 102. For illustration purposes, the navigation module 402, the information module 410, and the media module 414, shown in a dash rectangle, are depicted as communicatively connected to the first device 102 and the public display system 108.

The navigation module 402 can send the current location 206 of FIG. 2 and the navigation route 208 of FIG. 2 to the media module 414 for further processing. The media module 414 can communicate with the information module 410 to obtain the preferences 412 of FIG. 4, the usage information 413 of FIG. 4, or a combination thereof. The media module 414 can identify the public display location 214 of FIG. 2 that is in the path, such as the navigation route 208. Based on the point of interest 212 of FIG. 2 located in an area along the navigation route 208, the media module 414 can schedule and push appropriately the location-based notification 210 of FIG. 2 to the public display system 108 so that the location-based notification 210 can be clearly and safely viewed before the vehicle passes by the public display system 108.

Thus, it has been discovered that the navigation system 100 of the present invention furnish or furnishes important and heretofore unknown and unavailable solutions, capabilities, and functional aspects for a navigation system with location estimation.

The navigation system 100 describes the module functions or order as an example. The modules can be partitioned differently. For example, the time-based selection module 502 of FIG. 5 and the distance-based selection module 506 of FIG. 5 can be implemented as a single module. Each of the modules can operate individually and independently of the other modules.

Figure 8:
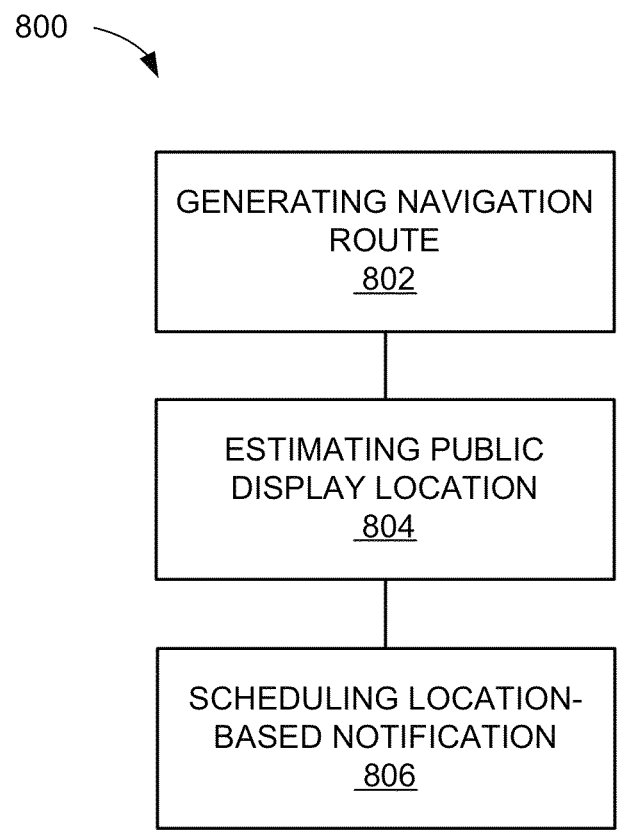
FIG. 8 is a flow chart of a method of operation of the navigation system in a further embodiment of the present invention.

Referring now to FIG. 8, therein is shown a flow chart of a method 800 of operation of the navigation system 100 in a further embodiment of the present invention. The method 800 includes: generating a navigation route for displaying on a device in a block 802; estimating a public display location along the navigation route in a block 804; and scheduling a location-based notification to be presented at the public display location and prior to traversing the navigation route in a block 806.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
generating a navigation route for displaying on a device;
calculating an estimated time of arrival at a public display location along the navigation route; and
scheduling a location-based notification for presenting on a public display system at the public display location prior to traversing the navigation route including:
sending the location-based notification to the public display system before a current location is near the public display location, and
adjusting a number of time units allocated for displaying the location-based notification based on viewing a media output device in a public place for a sufficient amount of time.

2. The method as claimed in claim 1 further comprising selecting the location-based notification associated with the navigation route.

3. The method as claimed in claim 1 further comprising identifying the location-based notification based on an estimated time of arrival to a point of interest.

4. The method as claimed in claim 1 further comprising identifying the location-based notification based on a remaining distance to a point of interest.

5. The method as claimed in claim 1 further comprising identifying the location-based notification based on a traffic condition along the navigation route.

6. A method of operation of a navigation system comprising:
receiving a preference;
generating a navigation route for displaying on a device;
calculating an estimated time of arrival at a public display location along the navigation route;
selecting a location-based notification based on the preference; and
scheduling the location-based notification for presenting on a public display system at the public display location prior to traversing the navigation route including:
sending the location-based notification to the public display system before a current location is near the public display location, and
adjusting a number of time units allocated for displaying the location-based notification based on viewing a media output device in a public place for a sufficient amount of time.

7. The method as claimed in claim 6 wherein selecting the location-based notification includes selecting the location-based notification based on usage information and associated with the navigation route.

8. The method as claimed in claim 6 wherein selecting the location-based notification includes identifying the location-based notification based on an estimated time of arrival to a point of interest with the estimated time of arrival during hours of operation of the point of interest.

9. The method as claimed in claim 6 wherein selecting the location-based notification includes identifying the location-based notification based on a remaining distance to a point of interest and a distance threshold.

10. The method as claimed in claim 6 wherein selecting the location-based notification includes identifying the location-based notification based on a traffic condition along the navigation route and a traffic threshold.

11. A navigation system comprising:
a control unit configured to execute a navigation module for generating a navigation route for displaying on a device;
a location unit, coupled to the control unit, configured to execute an identify location module for calculating an estimated time of arrival at a public display location along the navigation route; and
wherein:
the control unit is further configured to:
schedule a location-based notification for presenting on a public display system at the public display location prior to traversing the navigation route,
send the location-based notification to the public display system before a current location is near the public display location, and
estimate a view time, on a media output device in a public place, having a number of time units allocated for displaying the location-based notification adjusted based on the media output device viewed for a sufficient amount of time.

12. The system as claimed in claim 11 wherein the control unit is configured to execute a select notification module for selecting the location-based notification associated with the navigation route.

13. The system as claimed in claim 11 wherein the control unit is configured to execute a time-based selection module for identifying the location-based notification based on an estimated time of arrival to a point of interest.

14. The system as claimed in claim 11 wherein the control unit is configured to execute a distance-based selection module for identifying the location-based notification based on a remaining distance to a point of interest.

15. The system as claimed in claim 11 wherein the control unit is configured to execute a traffic-based selection module for identifying the location-based notification based on a traffic condition along the navigation route.

16. The system as claimed in claim 11 further comprising:
a communication unit, coupled to the control unit, for executing an obtain module for receiving a preference; and a user interface, coupled to the control unit, for executing a select notification module for selecting the location-based notification based on the preference.

17. The system as claimed in claim 16 wherein the control unit is configured to execute the select notification module is for selecting the location-based notification based on usage information and associated with the navigation route.

18. The system as claimed in claim 16 wherein the control unit is configured to execute the select notification module includes a time-based selection module for identifying the location-based notification based on an estimated time of arrival to a point of interest with the estimated time of arrival during hours of operation of the point of interest.

19. The system as claimed in claim 16 wherein the control unit is configured to execute the select notification module includes a distance-based selection module for identifying the location-based notification based on a remaining distance to a point of interest and a distance threshold.

20. The system as claimed in claim 16 wherein the control unit is configured to execute the select notification module includes a traffic-based selection module for identifying the location-based notification based on a traffic condition along the navigation route and a traffic threshold.

* * * * *